United States Patent
Engelen et al.

(10) Patent No.: US 8,908,313 B2
(45) Date of Patent: Dec. 9, 2014

(54) TRANSPORT SYSTEM FOR TRANSPORTING MAGNETIC TAPE

(71) Applicant: International Business Machines Corporation, Armonk, NY (US)

(72) Inventors: Johan B. C. Engelen, Zurich (CH); Simeon Furrer, Zurich (CH); Mark A. Lantz, Zurich (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/933,891

(22) Filed: Jul. 2, 2013

(65) Prior Publication Data

US 2014/0029131 A1    Jan. 30, 2014

(30) Foreign Application Priority Data

Jul. 27, 2012    (GB) .................................. 1213405.2

(51) Int. Cl.
| | | |
|---|---|---|
| *G11B 17/00* | (2006.01) | |
| *G11B 15/60* | (2006.01) | |
| *G11B 15/18* | (2006.01) | |
| *G11B 5/584* | (2006.01) | |
| *G11B 15/62* | (2006.01) | |

(52) U.S. Cl.
CPC ............... *G11B 15/18* (2013.01); *G11B 5/584* (2013.01); *G11B 15/602* (2013.01); *G11B 15/62* (2013.01)
USPC ........................... 360/71; 360/130.21; 226/94

(58) Field of Classification Search
None
See application file for complete search history.

(56) References Cited

U.S. PATENT DOCUMENTS

| | | | |
|---|---|---|---|
| 2,956,718 A | 10/1960 | Beveridge | |
| 3,030,524 A | 4/1962 | Miller | |
| 3,063,053 A | 11/1962 | Blake et al. | |
| 4,197,970 A * | 4/1980 | Plumadore | ...................... 226/94 |
| 4,285,020 A | 8/1981 | Sato | |
| 4,712,148 A | 12/1987 | Balz et al. | |
| 4,737,809 A | 4/1988 | Konno | |
| 5,475,548 A | 12/1995 | Rudi et al. | |
| 7,295,402 B2 | 11/2007 | Okawa et al. | |
| 7,649,710 B2 | 1/2010 | Bui et al. | |
| 7,961,430 B2 | 6/2011 | Biskeborn et al. | |
| 8,054,577 B2 | 11/2011 | Eaton | |
| 2005/0105210 A1 | 5/2005 | Okawa et al. | |

(Continued)

FOREIGN PATENT DOCUMENTS

| | | |
|---|---|---|
| EP | 0690442 A2 | 1/1996 |
| GB | 865582 | 4/1961 |

(Continued)

OTHER PUBLICATIONS

GB Search Report, Intellectual Property Office; Application No. GB1213405.2; Patents Act 1977: Search Report Under Section 17(5); Date Mailed: Nov. 28, 2012; pp. 1-5.

(Continued)

*Primary Examiner* — Andrew L Sniezek
(74) *Attorney, Agent, or Firm* — Cantor Colburn LLP

(57) ABSTRACT

A transport system for transporting magnetic tape includes at least one roller for guiding the magnetic tape having at least one electrode and a controller being configured to apply a voltage to the at least one electrode so as to produce a force of attraction between the magnetic tape and the at least one electrode.

11 Claims, 7 Drawing Sheets

(56) References Cited

U.S. PATENT DOCUMENTS

| | | |
|---|---|---|
| 2008/0247076 A1 | 10/2008 | Ycas |
| 2009/0001206 A1 | 1/2009 | Ycas |
| 2009/0001207 A1 | 1/2009 | Tresso et al. |
| 2009/0201609 A1 | 8/2009 | Argumedo et al. |

FOREIGN PATENT DOCUMENTS

| | | |
|---|---|---|
| GB | 1500829 | 2/1978 |
| GB | 2196927 A | 5/1988 |
| JP | 04216348 | 8/1992 |
| JP | 07182732 | 7/1995 |
| JP | H11279764 A | 10/1999 |
| JP | 2000251348 | 9/2000 |
| JP | 2005247475 | 9/2009 |
| JP | 2011175687 A | 9/2011 |
| WO | 9113017 | 9/1991 |

OTHER PUBLICATIONS

GB Search Report, Intellectual Property Office; Application No. GB1213406.0; Patents Act 1977: Search Report Under Section 17(5); Date Mailed: Nov. 28, 2012; pp. 1-4.

Gentilini et al., "Lateral Tape Motion Control With Robust Performance Evaluation Based on RBode Plot," IEEE Transactions on Industrial Electronics, vol. 59, No. 10, Oct. 2012, 8 pages.

Boettcher et al., "Dynamic Modeling and Control of a Piezo-Electric Dual-Stage Tape servo Actuator," IEEE Transactions on Magnetics, vol. 45, No. 7, Jul. 2009, 8 pages.

Raeymaekers et al., "The Effect of Friction between a Cylindrical Guide and Magnetic Tape on Lateral Tape Motion," Center for Magnetic Recording Research, Proceedings of AUSTRIB 06 Conference, Brisbane, Australia, Dec. 3-6, 2006, 6 pages.

Pantazi et al., "Track-following in tape storage: Lateral tape motion and control," Elsevier Mechatronics, vol. 22, 2012, pp. 361-367.

\* cited by examiner

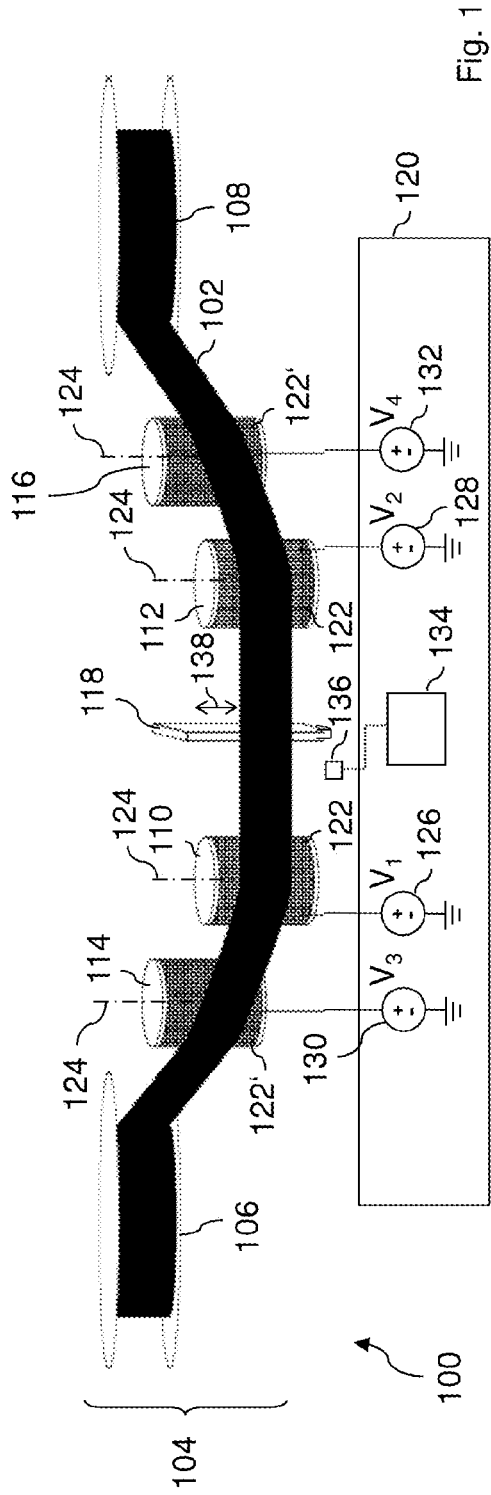
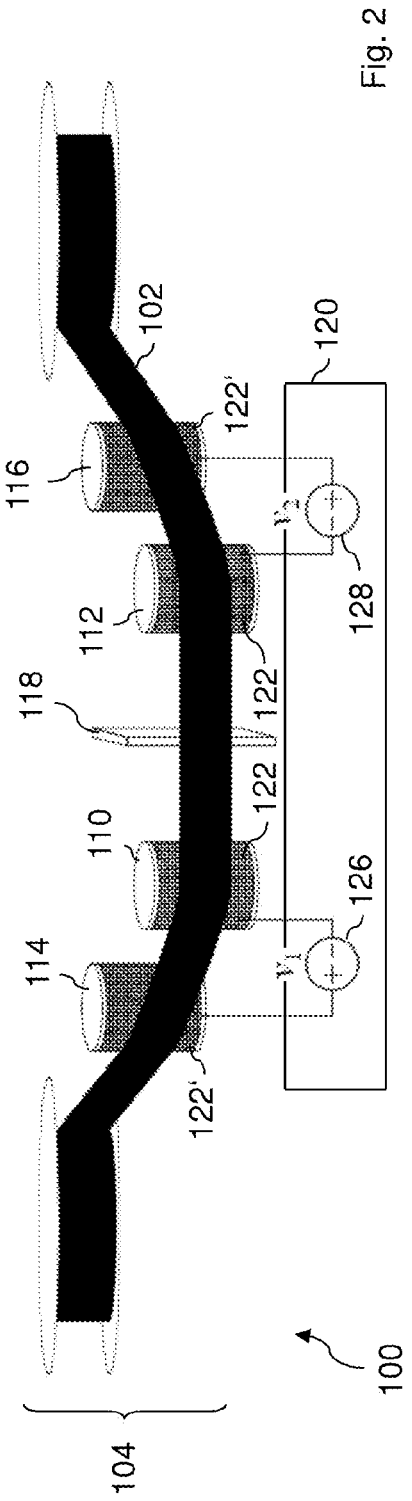
Fig. 1
Fig. 2

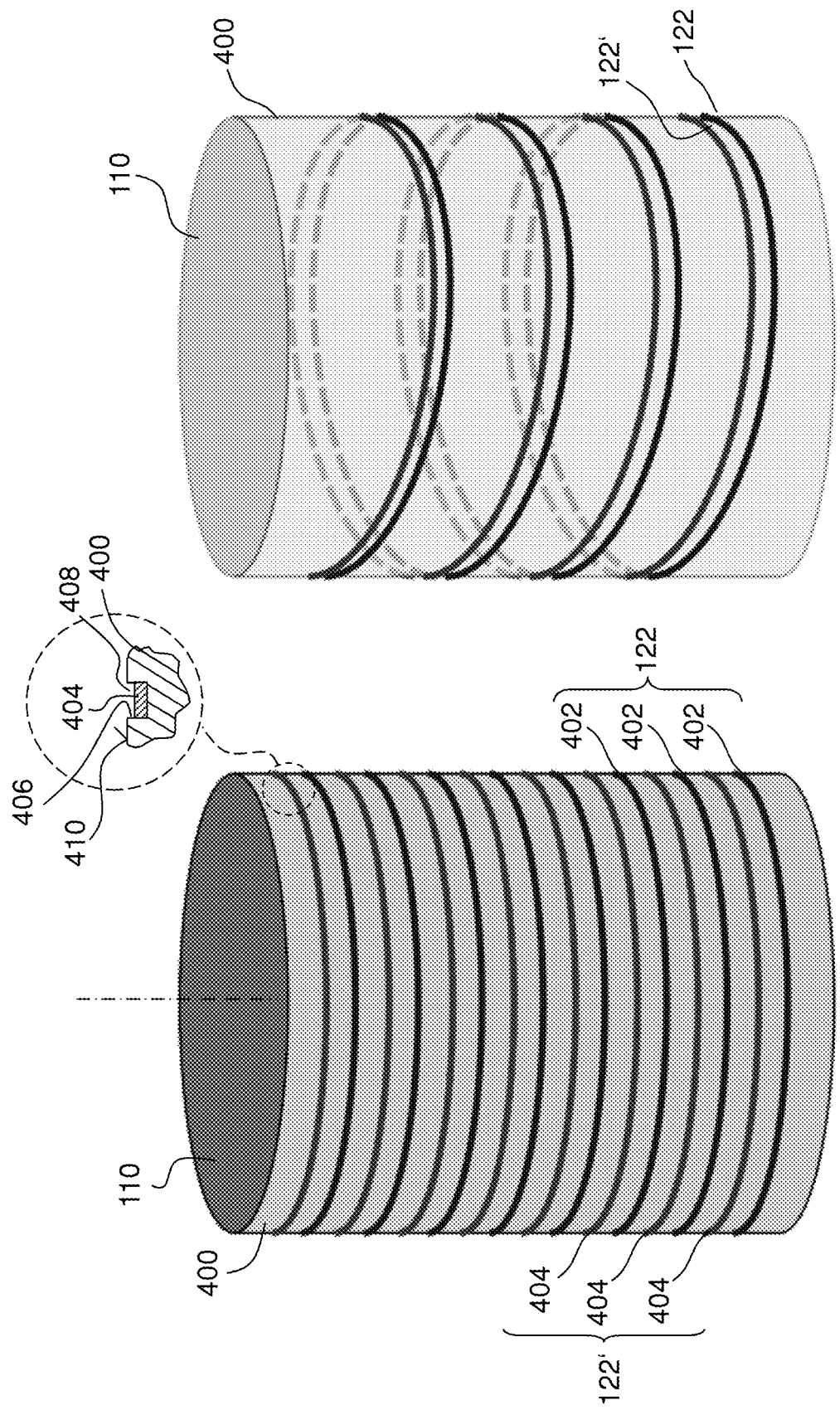

TRANSPORT SYSTEM FOR TRANSPORTING MAGNETIC TAPE

PRIORITY

This application claims priority to Great Britain Application No. 1213405.2, filed 27 Jul. 2012, and all the benefits accruing therefrom under 35 U.S.C. §119, the contents of which in its entirety are herein incorporated by reference.

BACKGROUND

The invention relates to a transport system for transporting magnetic tape, an apparatus, in particular for data storage and/or writing servo patterns, and a method for operating a transport system for transporting magnetic tape.

In modern tape systems, data is organized in data tracks which are written and read back in a parallel fashion by a read and write head comprising servo read, data read and data write elements, i.e., transducer elements. These data tracks run in the longitudinal direction of the magnetic tape and are much narrower than the excursions the magnetic tape experiences in the lateral direction (also referred to as lateral tape motion, "LTM") as a result of imperfections in the mechanical entrainment system. Therefore, it is crucial to accurately position the head relative to the magnetic tape in the lateral direction, and to maintain this relative position as the magnetic tape is streamed. To this end, as well as for other purposes, media manufacturers write servo tracks on the magnetic tape parallel to and interleaved with the data tracks. The servo read elements read the servo information stored in the servo tracks, which is then used for aligning the head with the data tracks on the magnetic tape.

Servo tracks are typically written to the magnetic tape using one servo write element for each servo track. Each servo write element generally comprises a yoke having one or more gaps and a coil for producing a magnetic field at each gap. The write elements are configured to imprint a specific pattern on the magnetic tape via fringing magnetic fields. This pattern contains the information required to determine the instantaneous lateral location of the data read and write elements (or the head as a whole) using a timing-based-servo (TBS) scheme as for example described in EP 0 690 442 A2.

TBS is a technology that was developed specifically for linear tape drives. It has been adopted by the Linear Tape Open (LTO) Consortium as a standard for the so-called LTO tape drive systems. In TBS systems, servo patterns generally comprise chevron shapes, having magnetic transitions with two different azimuthal slopes. An estimate of the head position is derived from the relative timing of pulses (also known as di-bits) generated by the read element reading the servo pattern.

However, due to limited bandwidth and slew rate of the head actuating system, the head cannot follow high frequency or large amplitude LTM. This is why in some known transport systems magnetic tape is transported from a cartridge reel to a take-up reel via a plurality of rollers having flanges on both ends to mechanically constrain LTM.

SUMMARY

In one embodiment, a transport system for transporting magnetic tape includes at least one roller configured to guide the magnetic tape, the at least one roller having at least one electrode; and a controller being configured to apply a voltage to the at least one electrode so as to produce a force of attraction between the magnetic tape and the at least one electrode.

In another embodiment, a method for operating a transport system for transporting magnetic tape is disclosed, wherein a controller applies a voltage to at least one electrode of a roller for guiding the magnetic tape, thereby producing a force attracting the magnetic tape to the at least one electrode.

BRIEF DESCRIPTION OF THE SEVERAL VIEWS OF THE DRAWINGS

In the following, exemplary embodiments of the present invention are described with reference to the enclosed figures.

FIG. 1 shows, in a perspective view, an apparatus according to one embodiment;

FIG. 2 shows, in a perspective view, an apparatus according to a further embodiment;

FIG. 4 shows, in a perspective view, a roller from FIG. 3;

FIG. 5 shows, in a perspective view, a roller according to a further embodiment;

Figure 3:
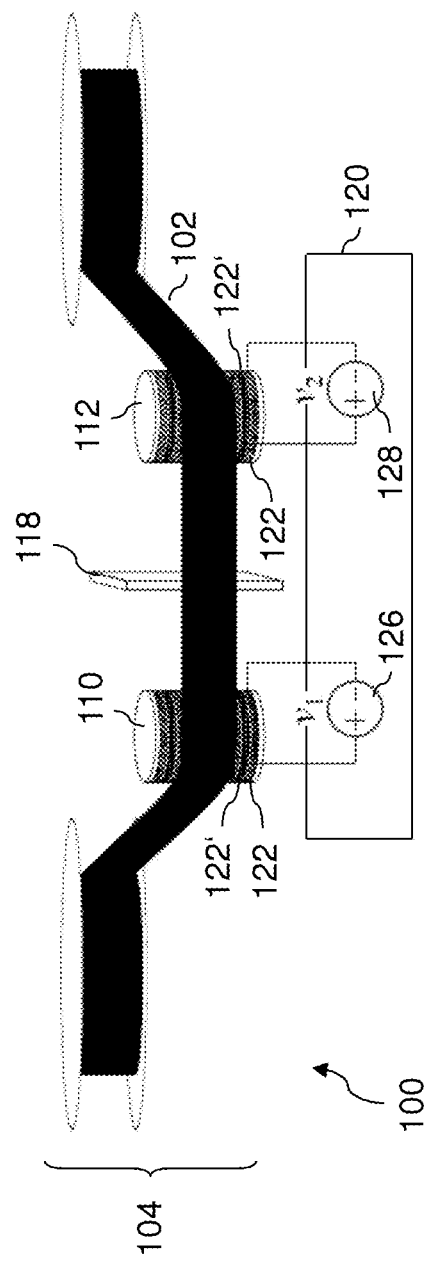
FIG. 3 shows, in a perspective view, an apparatus according to a further embodiment.

In the Figures, same reference signs refer to the same or functionally equivalent elements unless otherwise indicated.

DETAILED DESCRIPTION

According to one aspect, a transport system for transporting magnetic tape is provided. The transport system comprises at least: one roller for guiding the magnetic tape, the at least one roller having at least one electrode; and a controller being configured to apply a voltage to the at least one electrode so as to produce a force of attraction between the magnetic tape and the at least one electrode.

When the controller applies a voltage to the at least one electrode, image charges appear on the magnetic tape, i.e., there is a charge separation within the magnetic tape due to the external electric field generated by the at least one electrode. As a result, the magnetic tape is attracted to the at least one electrode and forced against the roller surface, thus generating friction forces that reduce LTM. The friction forces may act in a direction parallel to a roller turning axis. Furthermore, by statically or dynamically controlling the voltage applied to the at least one electrode by the controller, the electrostatic forces exerted on the magnetic tape and thus the friction forces may be controlled and adjusted to compensate for, e.g., varying speeds at which the magnetic tape is transported. Consequently, LTM may be reduced to acceptable levels.

Typically, magnetic tape comprises a number of thin conductive and dielectric layers. The resistivity of the magnetic tape may range from 105Ω per square to 109Ω per square.

The at least one electrode may form a part of or the entire roller surface. The roller surface is that part of the roller in contact with the magnetic tape during transport of the same.

In one embodiment, the controller may be formed as a connection to ground. In other embodiments, the controller may comprise one or more voltage sources controlled by a microprocessor.

The at least one electrode may be formed as a wire, strip or plate material. In particular, the electrode may comprise or consist of metal, for example copper, aluminum, steel, or of another suitable conductive material, for example titanium nitride, chromium nitride, titanium carbon nitride.

According to an embodiment, the transport system comprises at least two rollers, each roller having at least one electrode, the controller being configured to apply the same or different voltages, and particular voltages of the same magnitude but opposite polarity, to the electrodes. "Same" means same magnitude and polarity. For example, one electrode of the one roller may be grounded while one electrode of the other roller is at a certain voltage above or below ground. Or, the electrode of both rollers may be at a certain voltage relative to ground. In one exemplary embodiment, the controller applies voltages of the same magnitude, but opposite polarity, to the electrodes of both rollers. In this case, the magnetic tape is at virtual ground potential.

According to a further embodiment, the controller comprises at least one voltage source connecting the electrodes with each other. Thus, one (positive) terminal of the voltage source is connected to the electrode of the one roller and the other (negative) terminal of the voltage source is connected to the at least one electrode of the other roller. In this manner, the electrodes of the two rollers may be easily held at voltages of the same magnitude but opposite polarity.

According to a further embodiment, the at least one roller has at least two or three electrodes insulated from each other, the controller being configured to apply the same or different voltages, in particular voltages of the same magnitude but opposite polarity, to the electrodes. Again, the one electrode may be grounded, while the other electrode is at a certain voltage relative to ground, or both electrodes may be at a certain voltage relative to ground. In an exemplary embodiment, the electrodes are held at voltages of the same magnitude but opposite polarity. Since then, the magnetic tape will be at ground potential.

According to a further embodiment, the controller comprises at least one voltage source connecting the at least two electrodes with each other. For example, the one (positive) terminal of the voltage source is connected to one of the at least two electrodes, and the other (negative) terminal of the voltage source is connected to the other one of the at least two electrodes.

According to a further embodiment, the at least three electrodes and the controller together form an electrostatic image charge stepping actuator or an electrostatic induction motor configured to exert a force in a direction parallel to a roller turning axis on the magnetic tape. Thus, the electrodes may not only be used to exert a normal force (also termed attraction force herein) on the magnetic tape which generates friction forces between the magnetic tape and the roller surface and thus reduces LTM, but also actively produces a force that will move the magnetic tape or at least counteract other undesirable forces in a direction parallel to the roller turning axis. The controller may be configured to apply different voltage patterns to the at least three electrodes. For example, three different patterns may be provided that are consecutively applied to the at least three electrodes. Once the three patterns have been applied, this may be repeated until the desired force on the magnetic tape or movement of the magnetic tape is obtained. The voltage patterns may be stored on a suitable storage medium, for example a RAM or ROM of a microprocessor of the controller.

According to a further embodiment, the at least one electrode has, with respect to a roller turning axis, multiple circular or helical turns. In this manner, the magnetic tape may be attracted to the entire roller surface with substantially the same force. Further, helical turns can be easily manufactured, for example by winding the at least one electrode around the roller turning axis.

According to a further exemplary embodiment, the at least two or three electrodes are formed as a double or triple helix. The two or three electrodes can thus be easily manufactured, for example by winding the two or three electrodes at the same time around the roller turning axis.

According to a further embodiment, the roller has at least one groove receiving the at least one electrode. The at least one electrode is thus easily fixed in its position relative to the roller inside the groove. The at least one groove may form an air bleed reservoir above the at least one electrode. For example, the at least one electrode may, when seen in a cross-section, only partially fill up the groove. Thus, a reservoir for air remains atop the electrode. Via this reservoir, air can be removed from the space between the surface of the roller and the magnetic tape. Removing the air improves contact and thus friction between the magnetic tape and the roller.

According to a further embodiment, the at least one roller comprises an insulated surface having grooves forming the at least one electrode in between. The surface thus forms strips or fingers for example. The strips or fingers may together form a single electrode or a plurality of electrodes. The surface may be formed as a metal surface or from other conducting material. The grooves may be filled up with an insulating material.

According to a further embodiment, the grooves are formed by cutting, in particular by a lathe. For example, a CNC-lathe may be used. According to another embodiment, the grooves may be formed from a metal blank by punching or stamping.

According to a further embodiment, the transport system comprises a sensor for measuring a movement of the magnetic tape in a direction parallel to a roller turning axis. The voltage applied by the controller may be a function of the measured movement. Herein, "movement" includes a displacement, velocity or acceleration. Thus, the controller can dynamically react to the movement of the magnetic tape and thereby reduce LTM.

According to a further embodiment, the roller is configured as a flangeless roller. Having no flanges prevents tape edge damage and the build-up of wear debris on the roller.

Further, an apparatus, in particular for data storage and/or writing servo patterns, is provided. The apparatus comprises a magnetic tape and a transport system in accordance with the present invention.

The apparatus may comprise at least one head having one or more data and/or servo read and/or write elements for reading and/or writing of data and/or servo tracks. The head may be formed as a servo write head. At least one write element of the write head may comprise a yoke having at least one, preferably at least two gaps, and a coil for producing a magnetic field at the gap. Typically, the coil comprises a plurality of windings. A "gap" presently refers to an interruption in the yoke defined between opposite magnetic poles. The yoke comprises a magnetic material, for example iron, and is magnetized when a current flows through the coil. The yoke may be ring-shaped.

The head, in particular the read and/or write element(s), may be assembled from separately fabricated parts, or built-up from a planar substrate using thin-film microfabrication techniques. The latter presents advantages in terms of fabrication and decreased inductance and current, which enable writing more abrupt servo patterns and/or formatting the magnetic media at a greater speed. For example, the head and/or the read and/or write element may be built on a wafer, for example a silicon or AlTiC (Aluminum-Titanium-Carbide) wafer.

The head, in particular the servo write head, may be a planar head comprising a planar (also referred to as pancake) coil. Alternatively, the head, in particular the servo write head, may be comprise with a helical coil. A combination of planar or helical coils is also possible.

Further, a method for operating a transport system for transporting magnetic tape is provided. A controller applies a voltage to at least one electrode of a roller for guiding the magnetic tape, thereby producing a force attracting the magnetic tape to the at least one electrode.

Features and advantages explained above in the context of the transport system apply mutatis mutandis to the apparatus and the method of the present invention.

FIG. 1 shows an apparatus 100 for data storage and/or writing servo patterns. The apparatus 100 comprises a magnetic tape 102 which is transported by a transport system 104. The transport system 104 has a cartridge reel 106, a take-up reel 108 and a plurality of rollers 110, 112, 114, 116 which guide the magnetic tape 102 from the cartridge reel 106 to the take-up reel 108. Generally, between two and five rollers are used. In the example, four rollers are used. The cartridge reel 106 and take-up reel 108 may be driven by electric motors (not shown). The rollers 110, 112, 114, 116, which may be configured as flangeless rollers, guide the magnetic tape 102 past a head 118 of the apparatus 100. The head 118 may comprise multiple read and/or write elements. For example, when the apparatus 100 is configured as a data storage device, the head 118 will comprise data read and write as well as servo read elements. On the other hand, when the apparatus 100 is configured as a servo writer, the head 118 will comprise servo write elements configured to write a servo pattern on the magnetic tape 102. The transport system 104 also comprises a controller 120.

Each (or only some) of the rollers 110, 112, 114, 116 comprises an electrode 122, 122'. According to the embodiment of FIG. 1, each electrode 122, 122' is formed as a circumferential surface of each roller 110, 112, 114, 116. The electrodes 122, 122' may be in direct contact with the magnetic tape 102 as the rollers 110, 112, 114, 116 turn about their respective turning axes 124. Or, the electrodes 122, 122' may be spaced from the magnetic tape 102 by a thin electrically insulating layer of, for example, elastomeric material. The controller 120 is configured to apply a voltage V1, V2, V3, V4 to the electrodes 122, 122' of the rollers 110, 112, 114, 116 so as to produce a force of attraction between the magnetic tape 102 and a respective electrode 122, 122' or other surface parts of the rollers 110, 112, 114, 116. To this end, the controller 120 may comprise a number of voltage sources 126, 128, 130, 132 as well as, optionally, a microprocessor 134 controlling the voltage sources 126, 128, 130, 132. One terminal of each voltage source 126, 128, 130, 132 is connected to one electrode 122, 122' and the other terminal is connected to ground. The electrodes 122, 122' may be connected to a respective voltage source 126, 128, 130, 132 by sliding contacts, for example. The voltages V1, V2, V3, and V4 may range between −100 V and 100 V.

The transport system 104 may also comprise a sensor 136 for measuring a movement of the magnetic tape 102 in a direction parallel to a respective roller turning axis 124 and/or with respect to the head 118. The sensor 136 may detect a lateral movement 138 of the magnetic tape 102. The sensor 136 may, to this end, detect a displacement, a velocity or an acceleration of the magnetic tape 102 in the lateral direction 138. The controller 120 applies suitable voltages V1, V2, V3, V4 to the electrodes 122, 122' as a function of the measured movement, thus generating friction forces between the magnetic tape 102 and the electrodes 122, 122' so as to decrease lateral tape movement and increase track-follow performance.

However, in other embodiments, no dynamic control is provided as explained above, but a static control only is provided. In this case, the microprocessor 134 and the sensor 136 may not be provided and the voltage sources 126, 128, 130, 132 may apply a set voltage to the electrodes 122, 122' (which does not vary as a function of time). Again, the friction forces generated between the magnetic tape 102 and the electrodes 122, 122' reduce LTM and increase track-follow performance.

FIG. 2 shows an apparatus 100 according to a further embodiment. The controller 120 has only a single voltage source 126, 128 for one pair of two electrodes 122, 122' respectively. Opposite terminals of the voltage source 126, 128 are connected to electrodes 122, 122', respectively. Thus, the controller 120 of FIG. 2 only requires two voltage sources 126, 128. Also, due to the configuration of FIG. 2, the magnetic tape 102 is at ground potential.

FIG. 3 shows an apparatus 100 according to a further embodiment. Rather than having two electrodes 122, 122' of a pair of rollers 110, 114 and 112, 116 (see FIG. 2) at different potentials, each roller 110, 112 (in this case, for example only two rollers may be used) comprises a first electrode 122 and a second electrode 122' connected to opposite terminals of a respective voltage source 126, 128.

FIG. 4 illustrates the roller 110 of FIG. 3 according to one example. The roller 110 has a body 400. The first electrode 122 has a plurality of rings 402 arranged alternatingly with rings 404 of the second electrode 122'. The rings 402 are connected to one another electrically (not shown). Also, the rings 404 are connected to one another electrically (not shown). Each ring 402, 404 may be formed by winding a piece of metal wire around the body 400. Alternatively, the rings 402, 404 may be formed by deposition techniques, for example. Even microfabrication techniques are feasible.

FIG. 4 also shows an enlarged partial cross-section of the roller 110. The ring 404 is seen to be arranged inside a groove 406 in the body 400. Above the ring 404, there is an air reservoir 408 formed in order to bleed air and inhibit the formation of an air bearing between the magnetic tape 102 and the roller 110. Via the air reservoir 408, air is taken away between the magnetic tape 102 and the surface 410 of the roller 110, which advantageously increases friction between the magnetic tape 102 and the roller 110.

FIG. 5 illustrates that, rather than using rings 402, 404, the electrodes 122, 122' may be formed as spirals. In the example according to FIG. 5, the spirals form together a double helix. The spirals may easily be formed by winding corresponding wires around the body 400. The spirals may also be formed by depositing a metal film on a body 400 of a roller 110 with an insulating surface and subsequently cutting spiral grooves to the depth of the insulating layer using for example a lathe. Alternatively, the spirals may also be formed by deposition or even microfabrication techniques, if desirable. Also, the spirals may be arranged inside grooves 406 as explained in connection with FIG. 4.

Figure 6:
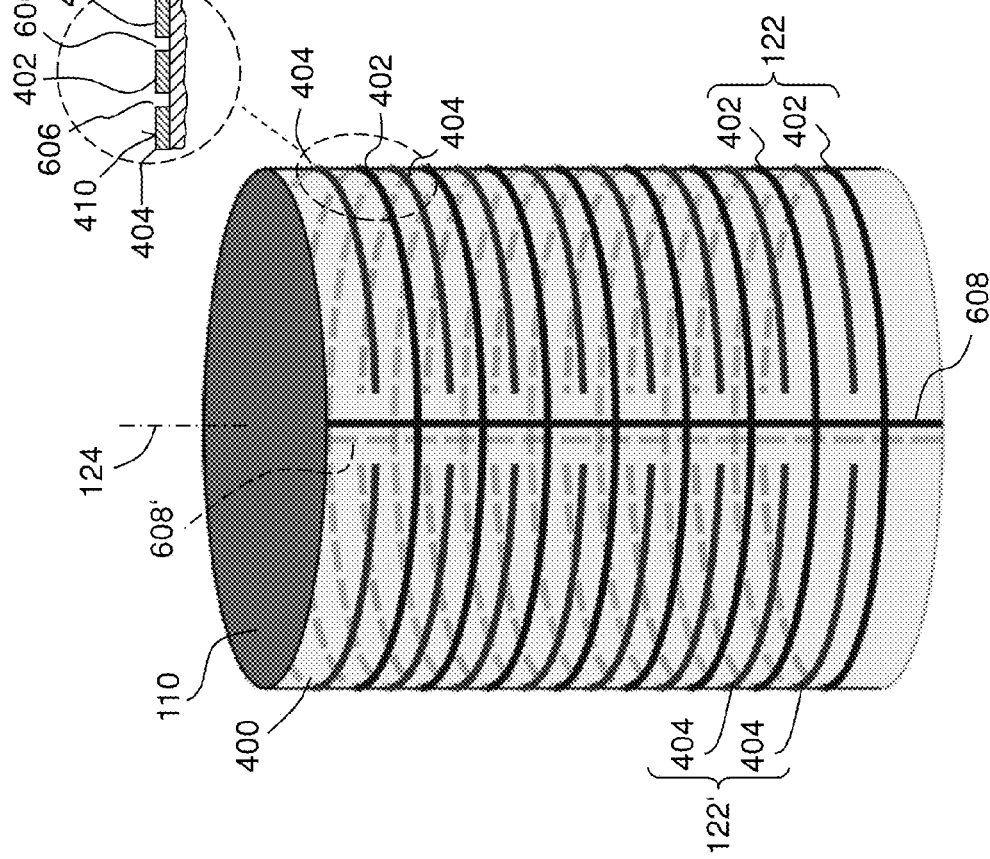
FIG. 6 shows, in a perspective view, a roller according to a further embodiment.

FIG. 6 illustrates a roller design, which may prove beneficial in preventing tape steering effects, which may be encountered with rollers according to the embodiment of FIG. 5. The roller 110 has a body 400 comprising a shell 600 (see the enlarged partial cross-section in FIG. 6) arranged on top of a layer or core of insulating material 602. The shell 600 forms the rollers circumferential surface 410 in contact with the magnetic tape 102. Grooves 606 have been cut into the shell 600 to form rings 402, 404. The rings 402 form the first electrode 122, and the rings 404 form the second electrode 122'; the grooves 606 may be cut by a CNC-lathe. Alternatively, the shell 600 may be formed from a blank by stamping or punching. In the example according to FIG. 6, the rings 402 are connected by a first strip 608 to form a single first electrode 122. By the same token, the rings 404 are connected by a second strip 608 to form a single second electrode 122'. The strips 608, 608' extend parallel to the turning axis 124 of the roller 110, for example.

Figure 7:
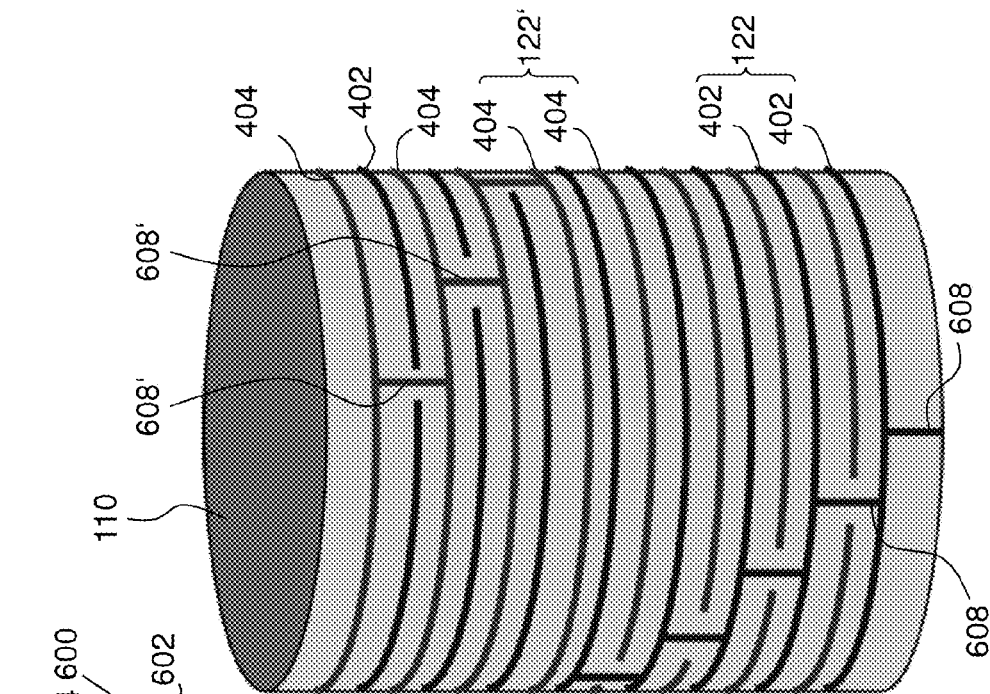
FIG. 7 shows, in a perspective view, a roller according to a further embodiment.

FIG. 7 shows a roller 110 according to a further embodiment. Rather than having a single strip 608 connecting all rings 402, the shell 600 has a plurality of first strips 608, which are offset with respect to each other in a circumferential direction of the roller 110. The same applies to second strip 608' connecting rings 404.

Figure 8:
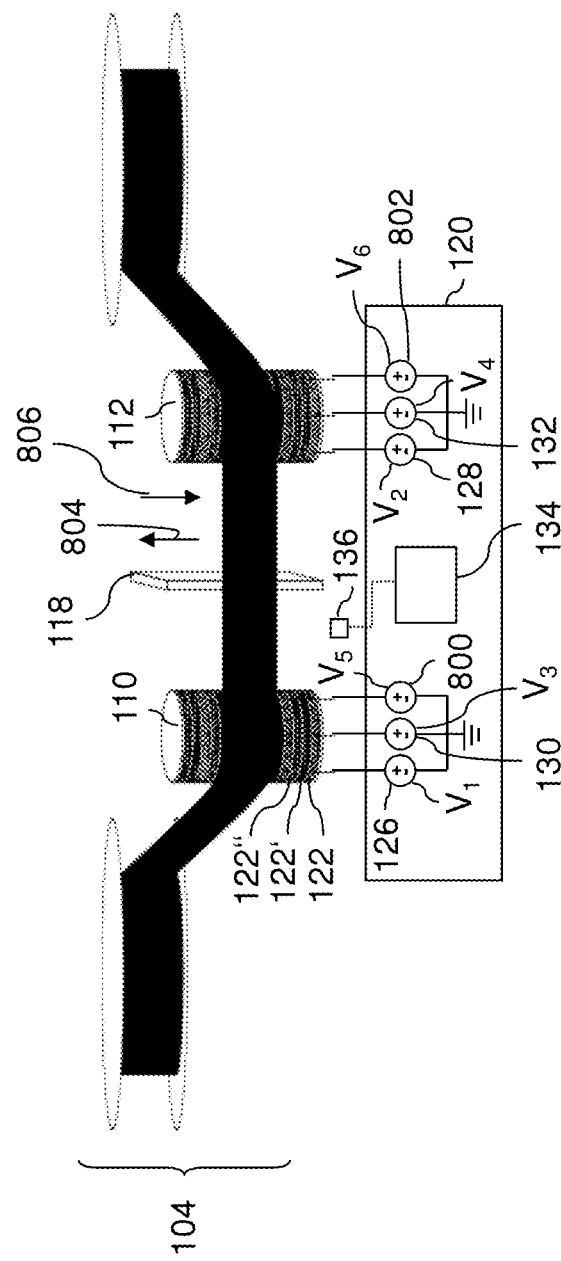
FIG. 8 shows, in a perspective view, an apparatus according to a further embodiment.

FIG. 8 shows an apparatus 100 according to a further embodiment. In addition to the two electrodes 122, 122' illustrated in FIG. 3, each roller 110, 112 of the embodiment according to FIG. 8 comprises an additional (third) electrode 122" connected to an additional voltage source 800, 802 of the controller 120.

Figure 9:
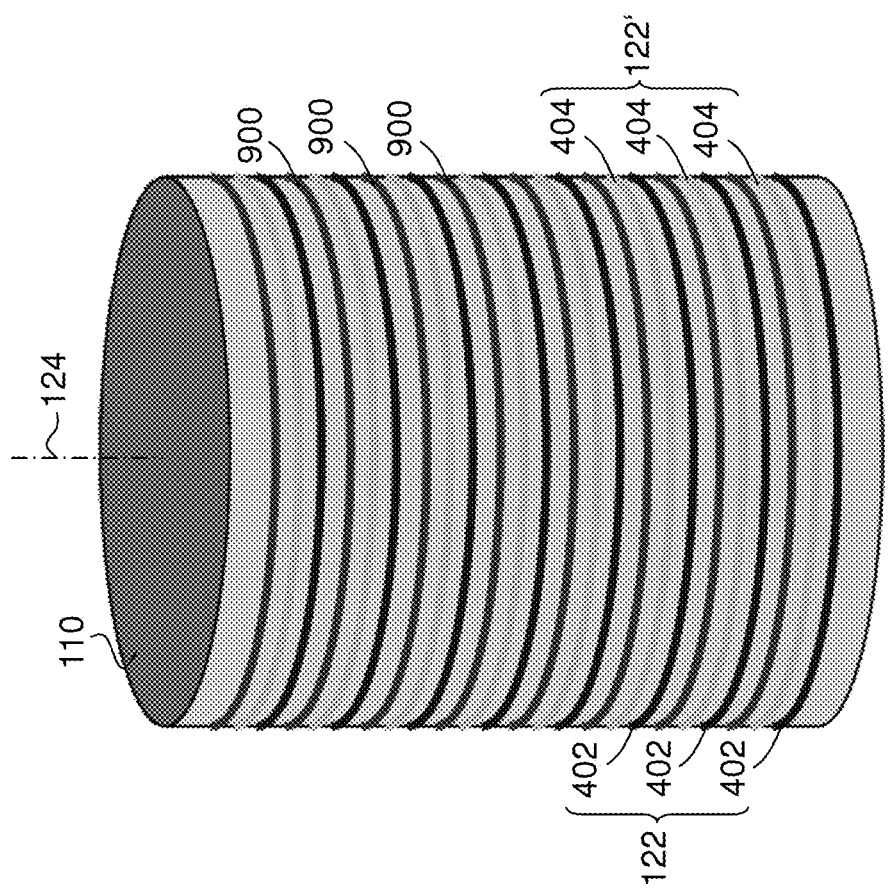
FIG. 9 shows, in a perspective view, a roller from FIG. 8.

FIG. 9 illustrates one embodiment of a roller 110 from FIG. 8. The configuration is very similar to the roller 110 of FIG. 4. However, additional rings 900 are provided forming the electrode 122". Thus, when looking in a direction parallel to the turning axis 124 of the roller 110, the electrodes are arranged alternatingly: first electrode 122, second electrode 122', third electrode 122", first electrode 122 . . . and so forth.

Figure 10:
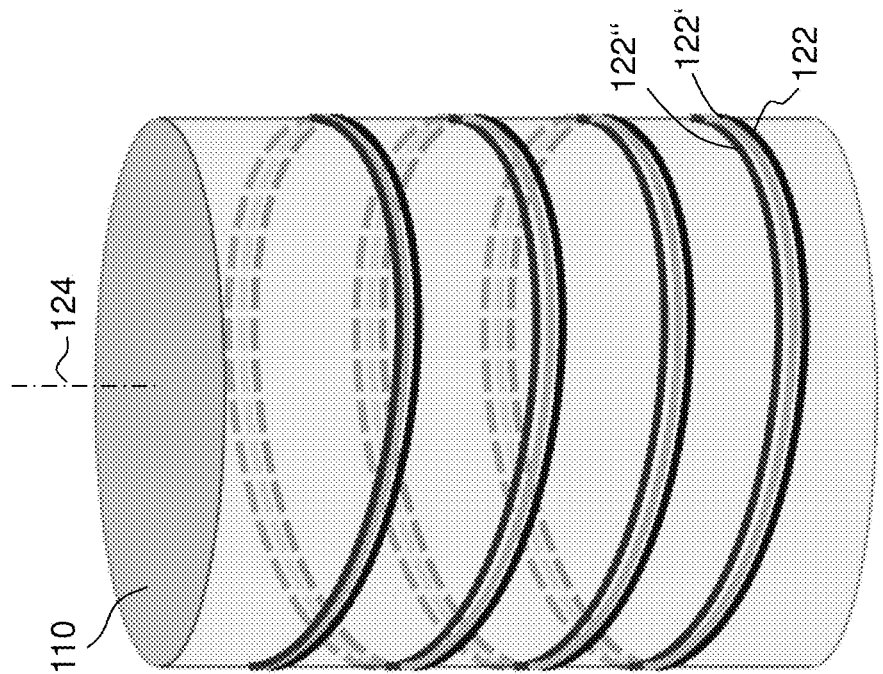
FIG. 10 shows, in a perspective view, a roller according to a further embodiment.

FIG. 10 corresponds to the embodiment of FIG. 5, yet the additional electrode 122" forms a triple helix with the electrodes 122, 122'.

Figure 11:
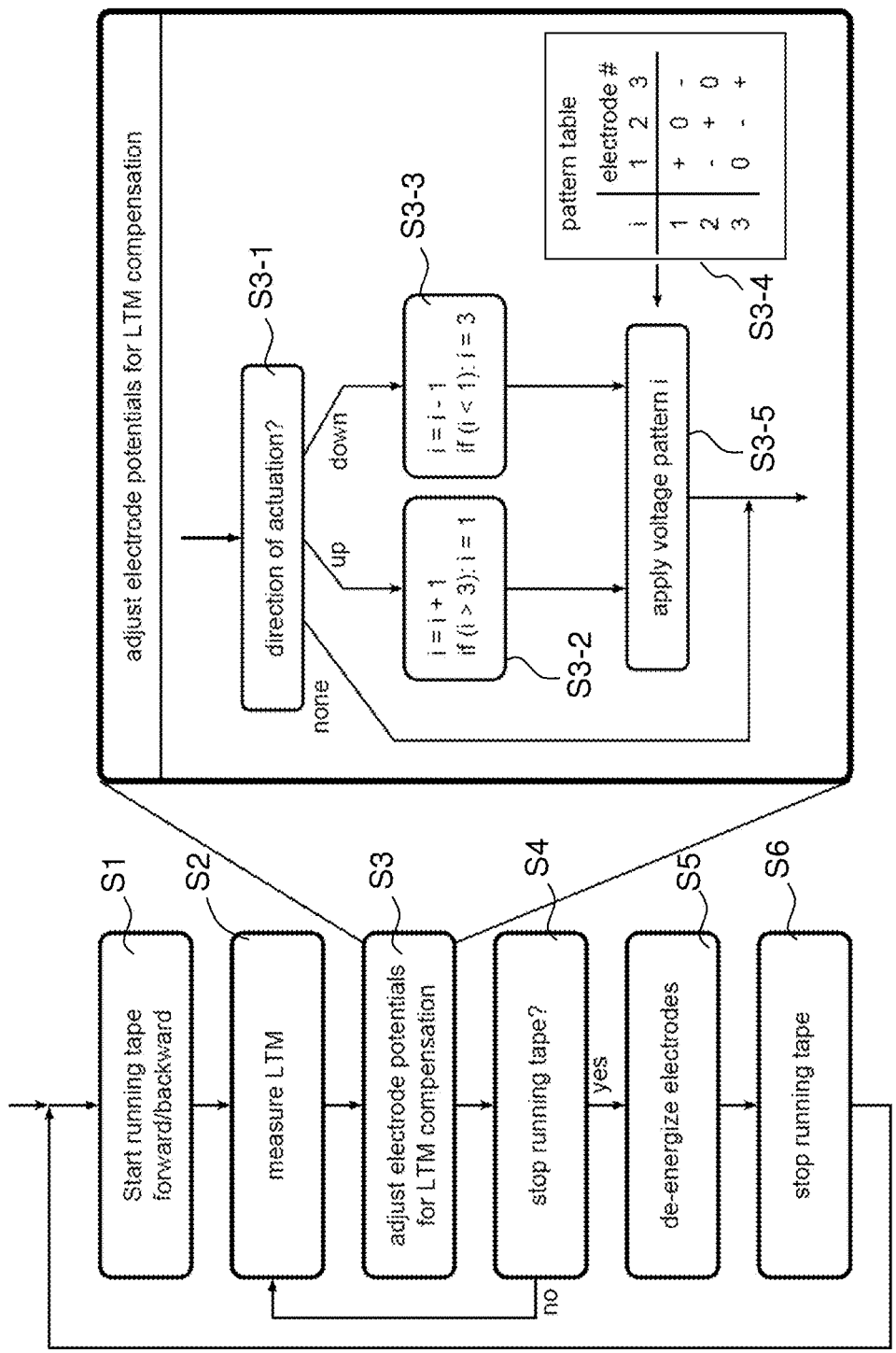
FIG. 11 shows a flowchart.

FIG. 11 illustrates a flowchart of a process carried out by the apparatus of FIG. 8.

In a first step S1, electric motors of the reels 106, 108 are energized to start the magnetic tape 102 to either run forward or backward.

In a second step S2, the sensor 136 (see FIG. 8) measures the tape's lateral motion (LTM) 138. In a step S3, the controller 120 adjusts the voltages V1-V6 to generate a normal force (acting normal to the surface 410 as illustrated in FIG. 6) pushing the magnetic tape 102 against the roller 110. In addition, the electrodes 122, 122', 122" may be operated as an electric image charge stepping actuator or electrostatic induction motor to exert a force in a direction parallel to the roller turning axis 124 on the magnetic tape 102. One example of a corresponding algorithm is illustrated in steps S3-1 to S3-5.

In step S3-1, the desired direction of actuation is provided. This direction may for example be calculated from values provided by the sensor 136. If it is then determined that the magnetic tape 102 should be moved upwards (indicated by the arrow 804 in FIG. 8), a counter i is incremented (step S3-2). When the counter i is larger than 3, the counter i is set to one. Based on the counter i, a voltage pattern is fetched from a pattern table stored on a storage media, for example, of the microprocessor 134 (step S3-4). The corresponding voltage pattern i is then applied to the electrodes 122, 122', 122" in a step S3-5 by the controller 120. This routine is repeated until it is determined in step S3-1 that no more adjustment of the magnetic tape 102 in the lateral direction is required.

On the other hand, when it is determined in step S3-1 that the magnetic tape 102 is to be moved downwards as indicated by the arrow 806 in FIG. 8, the counter i is decremented (step S3-3). When the counter i is smaller than 1, the counter i is set to 3. Again, a voltage pattern is fetched in step S3-4 and applied in step S3-5 based on the counter i by the controller 120. The routine S3-1, S3-3, S3-4, S3-5 is repeated until it is determined in step S3-1 that no more actuation in the downward direction is required.

In step S4, it is decided to either stop the magnetic tape, for example, when all data has been written to the magnetic tape 102. Then, the electrodes 122, 122', 122" are de-energized in a step S5, and the magnetic tape stops running in a step S6. Otherwise, the steps S2-S4 are repeated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. This is particularly true of the controller 120 described above. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In particular, the embodiments of FIGS. 1 to 11 may be combined with one another as required.

The invention claimed is:

1. A transport system for transporting magnetic tape, comprising:
   at least one roller configured to guide the magnetic tape, the at least one roller having at least three electrodes; and
   a controller being configured to apply a voltage to the at least three electrodes so as to produce a force of attraction between the magnetic tape and the at least three electrodes;
   wherein the at least one roller has at least two or three electrodes insulated from each other, the controller being configured to apply voltages of the same magnitude but opposite polarity, to the electrodes; and
   wherein the at least three electrodes and the controller together form an electrostatic image charge actuator or an electrostatic induction motor configured to exert a force in a direction parallel to a roller turning axis on the magnetic tape.

2. The transport system of claim 1, comprising at least two rollers, each roller having at least one electrode, the controller being configured to apply the same or different voltages, in particular voltages of the same magnitude but opposite polarity, to the electrodes of the at least two rollers.

3. The transport system of claim 2, wherein the controller comprises at least one voltage source connecting the electrodes with each other.

4. The transport system of claim 1, wherein the at least three electrodes have, with respect to a roller turning axis, multiple circular or helical turns.

5. The transport system of claim 1, wherein the at least one roller comprises an insulated surface having grooves forming the at least three electrodes in between.

6. The transport system of claim 5, wherein the grooves are formed by cutting by a lathe.

7. The transport system of claim 1, wherein the roller is configured as a flangeless roller.

8. A transport system for transporting magnetic tape, comprising:
   at least one roller configured to guide the magnetic tape, the at least one roller having at least three electrodes; and
   a controller being configured to apply a voltage to the at least three electrodes so as to produce a force of attraction between the magnetic tape and the at least three electrodes;
   wherein the at least one roller has at least two of three electrodes insulated from each other, the controller being configured to apply voltages of the same magnitude but opposite polarity, to the electrodes; and
   wherein the at least two of three electrodes are formed as a double or triple helix.

9. A transport system for transporting magnetic tape, comprising:
   at least one roller configured to guide the magnetic tape, the at least one roller having at least one electrode; and
   a controller configured to apply a voltage to the at least one electrode so as to produce a force of attraction between the magnetic tape and the at least one electrode;
   wherein the at least one roller has at least one groove receiving the at least one electrode, the at least one groove forming an air bleed reservoir above the at least one electrode.

10. A transport system for transporting magnetic tape, comprising:
    at least one roller configured to guide the magnetic tape, the at least one roller having at least one electrode;
    a controller configured to apply a voltage to the at least one electrode so as to produce a force of attraction between the magnetic tape and the at least one electrode; and
    a sensor configured to measure a movement of the magnetic tape in a direction parallel to a roller turning axis, the voltage applied by the controller being a function of the measured movement.

11. A method for transporting magnetic tape, the method comprising:
- configuring at least one roller configured to guide the magnetic tape, the at least one roller having at least three electrodes; and
- applying, with a controller, a voltage to the at least three electrodes so as to produce a force of attraction between the magnetic tape and the at least three electrodes;
- wherein the at least one roller has at least two or three electrodes insulated from each other, the controller being configured to apply voltages of the same magnitude but opposite polarity, to the electrodes; and
- wherein the at least three electrodes and the controller together form an electrostatic image charge actuator or an electrostatic induction motor configured to exert a force in a direction parallel to a roller turning axis on the magnetic tape.

* * * * *